(12) United States Patent
Nissel (10) Patent No.: US 6,257,862 B1
(45) Date of Patent: *Jul. 10, 2001

(54) SHEET PROCESSING SYSTEM

(75) Inventor: Frank R. Nissel, Ambler, PA (US)

(73) Assignee: Welex Incorporated, Blue Bell, PA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/023,263

(22) Filed: Feb. 13, 1998

(51) Int. Cl.[7] .................................................. B29C 47/34
(52) U.S. Cl. ..................... 425/377; 226/118.2; 425/308; 425/315
(58) Field of Search ..................................... 425/308, 315, 425/377, 461; 226/118.2

(56) References Cited

U.S. PATENT DOCUMENTS

| | | |
|---|---|---|
| 2,277,658 | 3/1942 | Anderson . |
| 3,130,888 | 4/1964 | Rothfuss et al. . |
| 3,515,327 * | 6/1970 | Bortmas ............................ 226/118.2 |
| 3,589,581 | 6/1971 | Swindells . |
| 3,687,348 | 8/1972 | Scheib . |
| 3,727,820 | 4/1973 | Braun . |
| 3,904,338 | 9/1975 | Straumanis . |
| 4,028,451 | 6/1977 | Warwicker . |
| 4,086,045 | 4/1978 | Thiel et al. . |
| 4,281,784 | 8/1981 | McMullen . |
| 4,360,137 * | 11/1982 | Noe et al. ........................ 226/118.2 |
| 4,391,400 | 7/1983 | Sylvain . |
| 4,609,336 | 9/1986 | Stevenson et al. . |

FOREIGN PATENT DOCUMENTS 2814184   10/1979   (DE) .

* cited by examiner

Primary Examiner—Tim Heitbrink
Assistant Examiner—Joseph Leyson
(74) Attorney, Agent, or Firm—Schnader Harrison Segal & Lewis LLP (57) ABSTRACT

A sheet processing system for continuously producing plastic sheet which is continuously supplied to an intermittent take-up device, utilizing a sheet forming apparatus, a conveyor, an accumulator and take-up apparatus, the sheet being fed along the conveyor to an accumulator positioned compactly beneath the conveyor, the accumulator being controlled in a cyclic operation which provides for the accumulation of the continuously fed sheet material to permit intermittent operation of the take-up apparatus.

9 Claims, 6 Drawing Sheets

Fig. 1
CONVENTIONAL

SHEET PROCESSING SYSTEM

BACKGROUND OF THE INVENTION

1. Field of the Invention

This invention relates to a sheet processing system and, more particularly, to a system for producing a continuous polymer sheet and winding it on a take-up roll, while providing for smooth and trouble-free take-up roll changes. Specifically, the invention provides a novel construction and arrangement for accumulating the continuously produced polymer sheet while the take-up roll is being changed on the fly.

2. Discussion of the Prior Art

Continuous sheet processing systems are known that provide for take-up roll changes. It is also known to be necessary to provide some form of accumulator between continuous and intermittent in-line processes.

U.S. Pat. No. 3,904,338 to Straumanis discloses a system and method of controlling a machine which continuously produces sheet that is supplied to an intermittently activated in-line processor. The system involves regulation of the sheet extrusion speed along with a vertically oriented and pivotally mounted dancer roller which acts as an accumulator.

Other references disclose various machines for accumulating and temporarily storing a loop of continuous strip material, using a roller loop carriage mounted on a track or cage assembly.

With some continuous sheet processing systems, a plastic sheet is extruded and cooled via a multiple roll stack (sometimes erroneously called a calendar), or a sheet take-off. It is subsequently run over a more or less horizontal stretch of idler rolls for further cooling, thickness measurement, surface treatment, etc. It is then usually edge trimmed to desired width, passed through a set of pull rolls and then wound into rolls on a winder.

These take-up rolls must be changed when they grow to a desired diameter. This creates a problem, especially at increasingly higher speeds because it is difficult to cut the web and transfer it to a new winding shaft in the short time available. This is also dangerous because operators have, at times, been injured in the transfer.

Automatic roll transfer systems exist but are limited to relatively thin plastic sheet because of their limited ability to cut thick plastic sheets. Besides, they are quite expensive. The thickest plastic sheet automatic cut-off system known to be available can cut up to about 0.030" (0.75 mm) thick sheet. But today it is often needed to wind sheet up to 0.80" or 0.100" (2–2.5 mm), or more.

Another frequently used device is a sheet accumulator between the sheet take-off and the winder. This uses a series of (usually vertically arranged) pairs of moveable rolls to accumulate the extruded sheet while the winder is slowed down or even stopped. These accumulators have several disadvantages:

1. They take up excessive valuable space.
2. They are expensive.
3. They require edge trimming after passing through the accumulator because the sheet is never perfectly straight and its edges tend to move laterally as the accumulator stores more or less material.
4. One further great disadvantage arises in building and running compact sheet lines wherein the winder is directly integrated into the downstream end of the sheet take-off. There is no room upstream on a sheet take-off system for the heavy and bulky conventional accumulator.

OBJECT OF THE INVENTION

It is an object of this invention to accommodate cutting and transfer of sheet material of various thicknesses between reels of a sheet take-up system.

It is a further object of this invention to provide a compact integral accumulator, compactly incorporated into the structure of the sheetmaking system, which does not require additional valuable floor or overhead space, and does not require inordinate expenditures for apparatus.

Other objects and advantages of the invention will become readily apparent to those skilled in the art from the drawings and description which follows.

BRIEF SUMMARY OF THE INVENTION

In accordance with this invention there is provided a more or less horizontally acting accumulator that fits below the roller conveyor section of the sheet production apparatus. It has unique advantages in that it takes up no room vertically or horizontally, precedes the usual edge trimmer location, and is very inexpensive to build.

In accordance with this invention there is provided a plastic sheet extrusion system fed by one or more extruders feeding a sheet extrusion die. The die is closely followed by a roll cooling system. The resulting partially cooled sheet is further cooled on a roller conveyor of finite length. This may be horizontal or inclined. (Practically this conveyor is about 10 to 20 ft. long, depending on the product). The conveyor incorporates a parallel acting accumulator loop (or loops) below its sheet carrying surface. The so arranged accumulator serves to permit roll changes at the winder at a reduced speed or zero speed by appropriate control of the pull roll speed.

The sheet is drawn over the conveyor and through the integral parallel acting accumulator, which according to this invention is positioned compactly beneath the conveyor by a pair of driven pull rolls positioned downstream of the conveyor. Passing from the accumulator the sheet is then edge trimmed to the desired width just prior to contacting the pull rolls. The sheet is then fed by the pull rolls to a winder which produces rolls of the sheet on a winder reel or takeup roll.

Once the rolls have reached a desired size, the pull rolls slow or stop the feeding of the sheet to the winder to allow transfer of the sheet to a new reel. At this time the accumulator elongates in a generally horizontal direction and begins to form the sheet into a substantially horizontal loop beneath the conveyor to accommodate the oncoming sheet which is still continuously being produced. Before the accumulator has reached its maximum storage length, ample time has been provided for the sheet to be severed transversely near the reel and transferred to a new reel. Once the transfer has been completed, the pull rolls resume feeding the sheet at a higher speed until the accumulator contracts in a generally horizontal direction and reaches its normally empty position, whereupon the pull roll speed is adjusted to approximately that of the incoming sheet.

DETAILED DESCRIPTION OF THE PREFERRED EMBODIMENTS

Although the present invention will be hereinafter described in regard to specific embodiments thereof, these embodiments are provided merely for illustration and explanation of the invention, which is not limited thereto but has a scope as defined in the appended claims.

Figure 1:
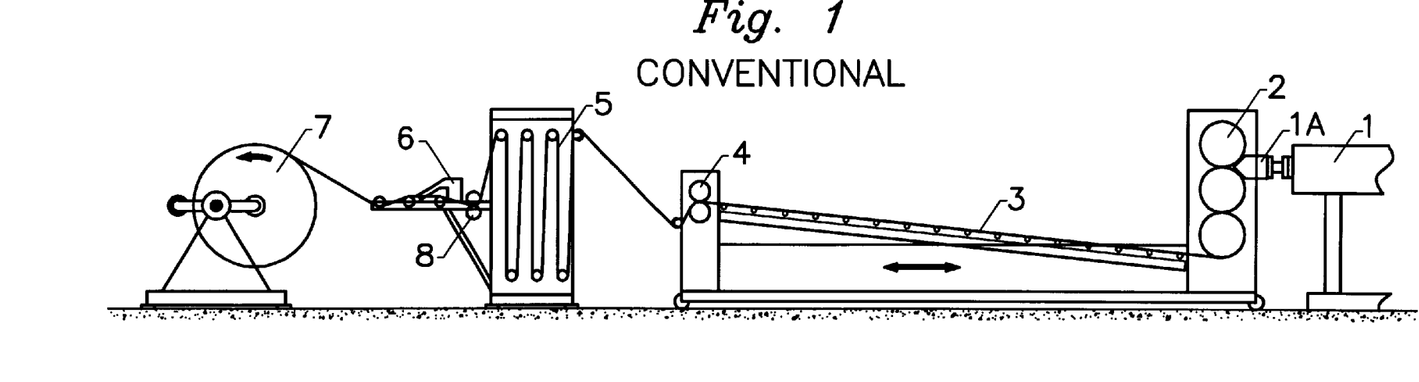
FIG. 1 shows a conventional plastic sheet extrusion line as currently used for high speed production of sheet in rolls.

Turning now to FIG. 1 of the drawings, showing a conventional sheet extrusion line, the number 1 is a conventional extruder that plasticizes and pumps the plastic material to die 1A that extrudes a sheet of finite width. 2 is a three roll sheet take-off also known colloquially as a calendar. It serves to cool the extruded sheet back to near room temperature. These three rolls are driven by a variable speed motor. 3 is an idler roll conveyor positioned to support the sheet while being finally cooled by ambient air. 4 is a set of pull rolls provided to maintain tension on the sheet going over the conveyor 3. These pull rolls are driven by a second variable speed motor. 5 is a vertically arranged sheet accumulator serving to permit intermediate storage of a certain length of sheet while rolls are changed when the winder is full. The accumulator of FIG. 1 is there shown in its filled condition with the accumulator rolls separated in the vertical direction. During normal running, the upper and lower banks of accumulator rolls are positioned close together so that they can later accumulate sheet by separating. This accumulation permits slowing or stopping of the outgoing sheet by adjusting the speed of the downstream pull rolls 8.

The number 6 in FIG. 1 designates edge trimmers necessary to cut the sheet to its finished width. This must be done downstream of the accumulator to ensure correct alignment because the sheet is often not perfectly straight and moves laterally as the roll spacing within the accumulator is changed. 7 is a roll winder producing rolls of finite length. An indexing two-position turret winder is shown because of its convenience, but any other single or multiple type of roll winder can be used.

Since the extruder 1 and die 1A of FIG. 1 are fixed in position, it is necessary to move the sheet take-off back and forth for access to the die and for maintenance. Sheet take-off systems are therefore usually mounted on wheels and track with motorized displacement. For screw removal of the extruder from its front, this displacement must be at least the length of the screw, and can be 10–20 feet or more. It is therefore desirable to have all of the equipment downstream of the extruder movable by this distance. This is difficult to achieve with the usually fixed accumulator system.

Figure 2:
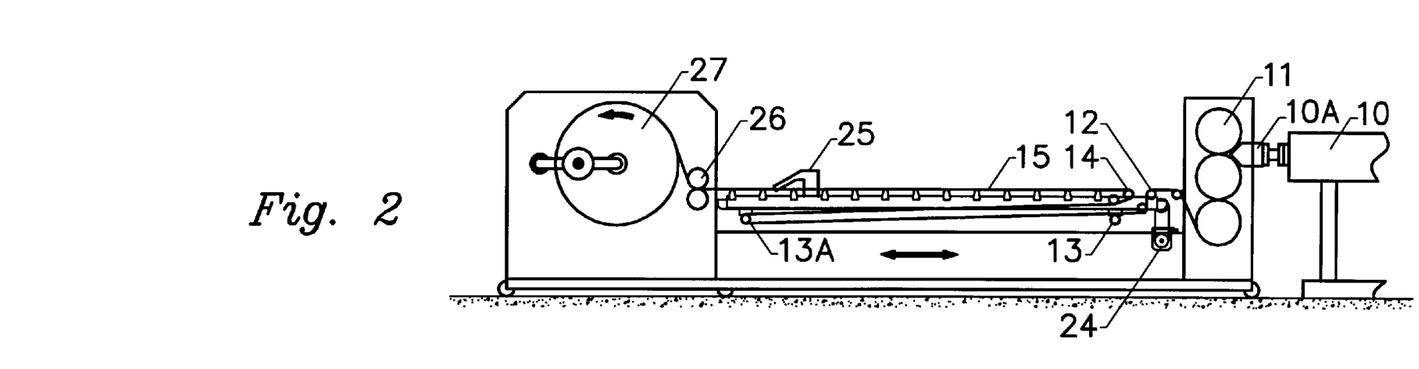
FIG. 2 is a view in side elevation showing an accumulator according to this invention.
Figures 3A, 3B:
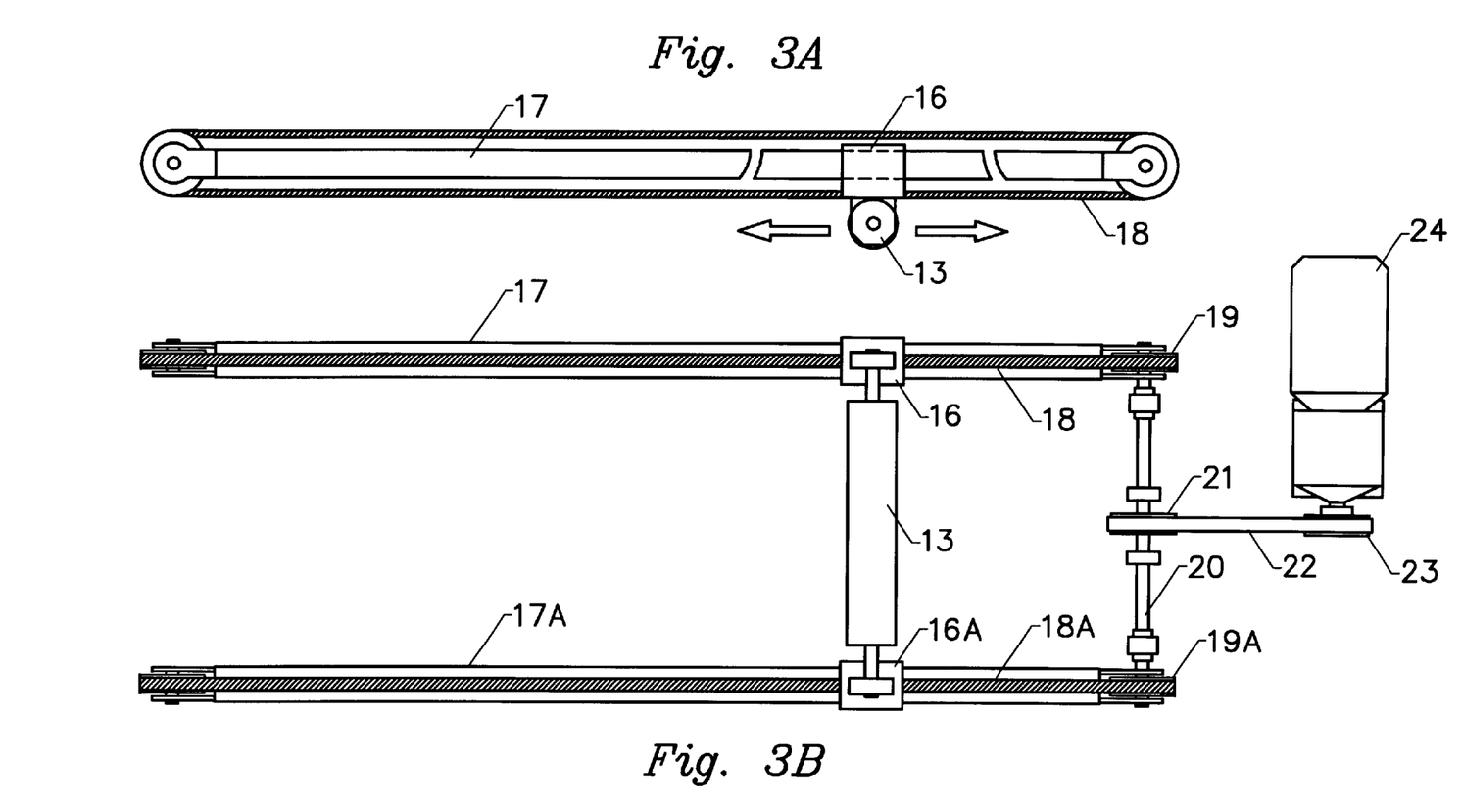
FIG. 3(A) is a side view, partly in section, showing details of the accumulator of the apparatus of FIG. 1.
FIG. 3(B) is a view, looking up from the bottom, of the accumulator apparatus of FIG. 3.

FIGS. 2, 3(A) and 3(B) show, in one form selected for illustration, the essence of the present invention in which FIGS. 3(A) and 3(B) represent one form of accumulator structure in accordance with this invention. 10 is an extruder equipped with a sheet die of finite width 10A. In FIG. 2, 11 designates the rolls of the cooling roll stack driven by a variable speed motor (not shown) at precisely controlled speed. After leaving the cooling rolls 11, the sheet is passed over fixed idler roll 12 from which it passes around displaceable idler roll 13. The number 13A designates the displaced position of displaceable roll 13 when the accumulator is full. The accumulator is empty when the roll is displaced to the end position as shown in FIG. 2 by reference numeral 13. In either position, 13, 13A the sheet is caused to return over fixed idler roll 14 to continue travelling over conveyor 15. The horizontal movement of idler roll 13 from position 13 to position 13A provides the accumulation of sheet when required. The arrow in FIG. 2 indicates this movement. This moveable roll 13 is mounted on two bearing blocks 16 and 16A (FIGS. 3(A) and 3(B)) that travel captively on two parallel tracks 17 and 17A (FIG. 3(B)). The movement of the idler roll bearing blocks is controlled by two belts, chains or cables 18 and 18A that are driven by pulleys 19 and 19A connected by a shaft 20 to maintain precisely parallel movement when the accumulator is extending or contracting. This shaft is driven by the operator via pulley 21 and belt 22 by a reversible motor 24 connected to pulley 23. This motor serves to maintain a finite tension on the sheet passing over idler roll 13A when the accumulator is extended in preparation for the sheet cut-off operation.

The number 25 in FIG. 2 is an edge trimming slitter that can now be mounted advantageously within the sheet take-off frame. 26 are pull rolls driven by a variable speed drive at finite speed. 27 is a closely coupled or integrated roll winder. A two-position indexing turret winder is shown but any other kind of roll winder may be used.

Figure 4A:
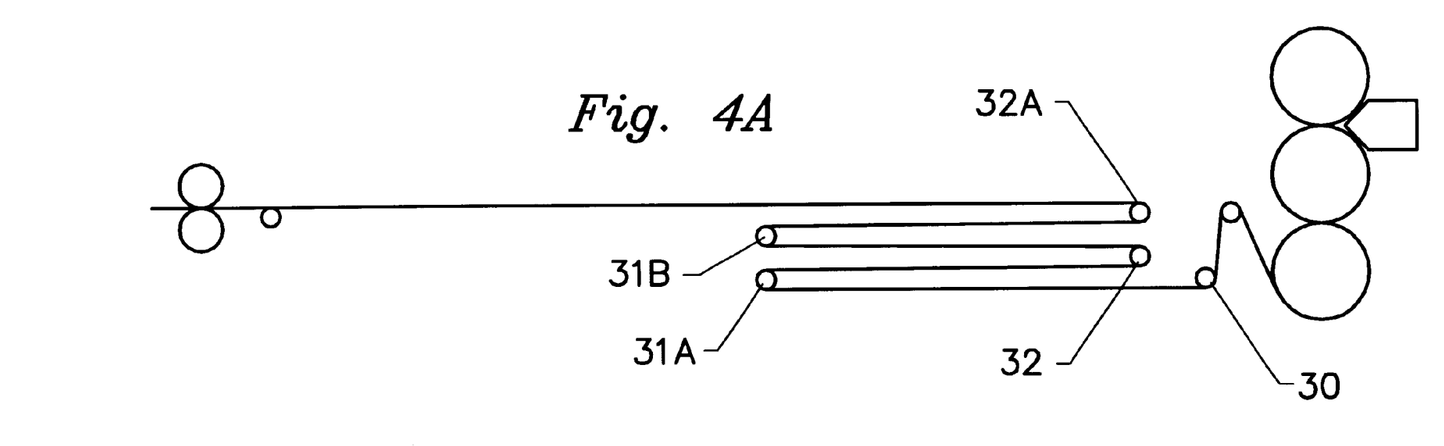
FIG. 4(A) is a schematic side view of an alternative larger accumulator arrangement.

Turning now to FIG. 4(A), while the accumulator system shown in FIGS. 2 and 3(A) and 3(B) uses a single traveling idler roll, this can accumulate a sheet length equal to twice the idler roll travel distance. If, in a particular case, this is not sufficient length to allow for convenient winder roll change, this can readily be increased by providing a plurality or a multiplicity of loops as shown in FIGS. 4(A) and 4(B).

With reference to FIG. 4(A), the extruded sheet travels in loops generated by fixed idlers 30, 32 and 32A and the jointly moving idler rolls 31A and 31B that are mounted and regulated in a manner similar to idler roll 13 of FIG. 2. In this instance, the accumulated length can be as much as four times the travel distance of the moving idler rolls.

Figure 4B:
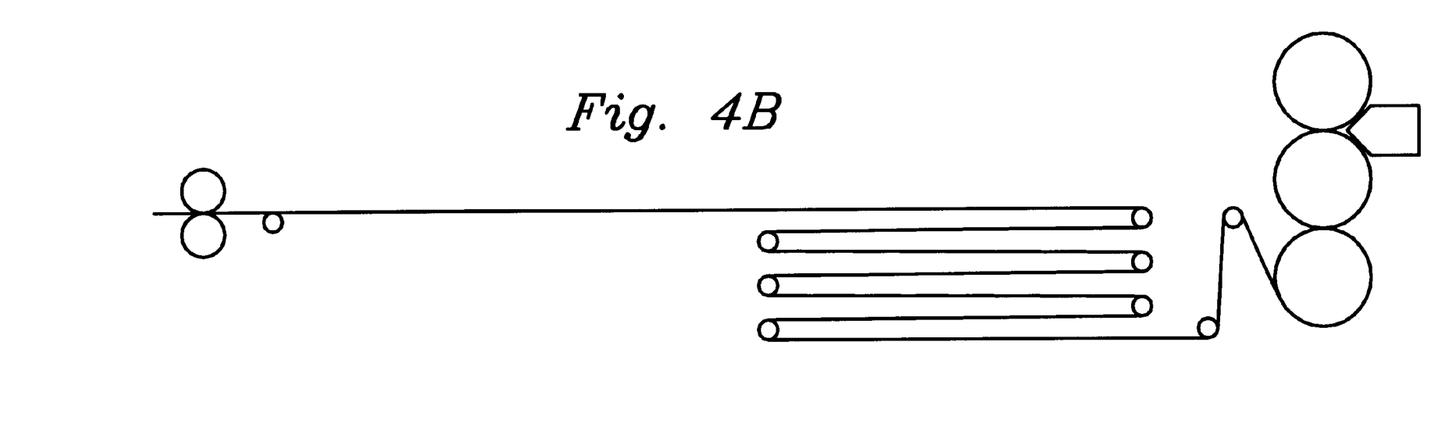
FIG. 4(B) is a view similar to FIG. 4(A) but showing an alternative arrangement in accordance with this invention.

FIG. 4(B) shows a further increase in storage capacity with three moving rollers that create a triple loop capable of accumulating up to six times the idler roll travel. It will readily be seen that the number of loops and their respective accumulation capacity is limited only by the space available.

FIGS. 5(A) through 5(E) show a typical winding roll changing sequence in accordance with this invention, that is facilitated by virtue of the invention. The numbered elements correspond to those described, with respect to FIG. 2.

Figure 5A:
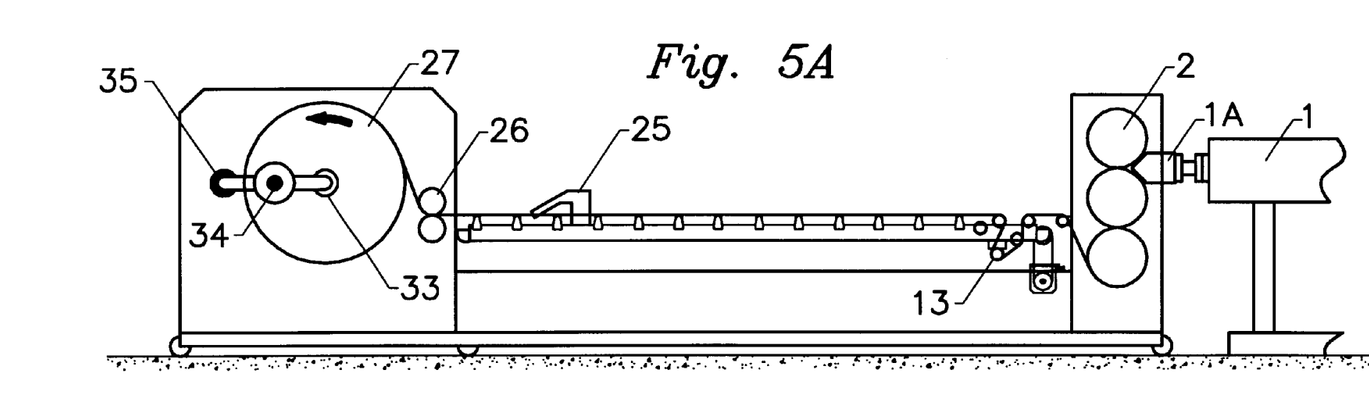
FIGS. 5(A) through 5(E) are a series of similar diagrams in side elevation showing successive stages of operation of one form of accumulator in accordance with this invention.
Figure 5B:
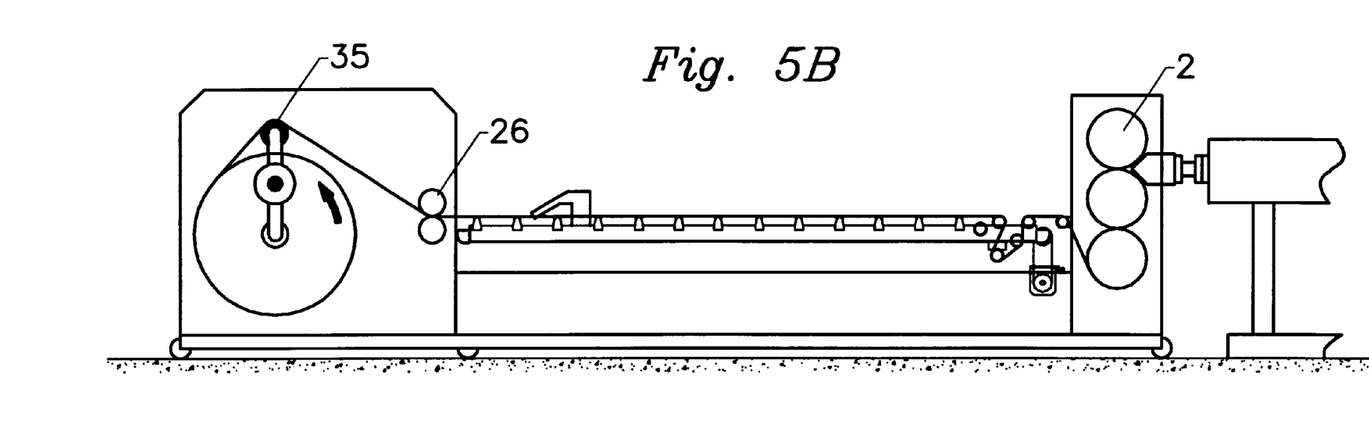
Figure 5C:
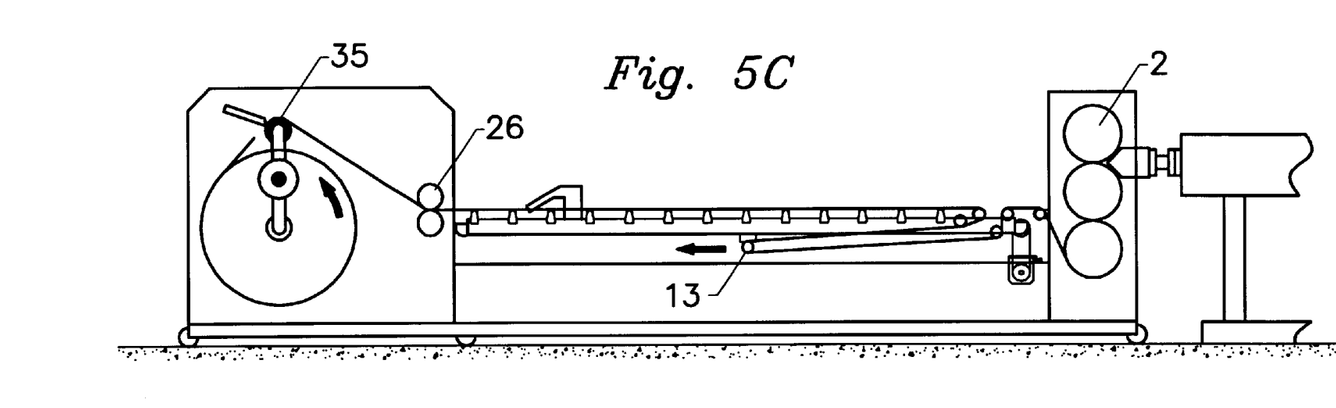
Figure 5D:
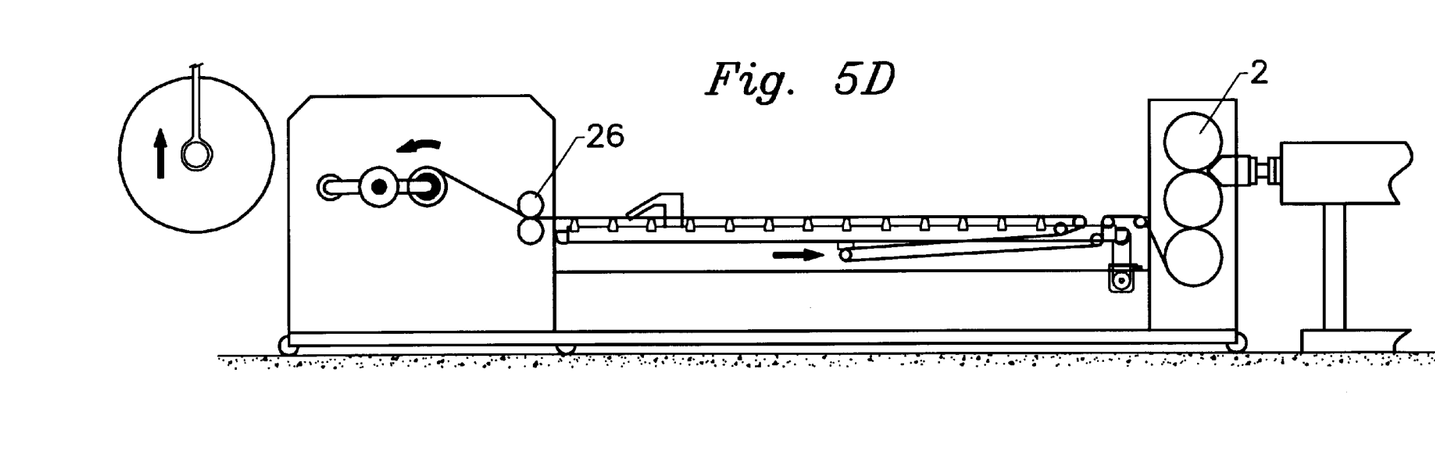
Figure 5E:
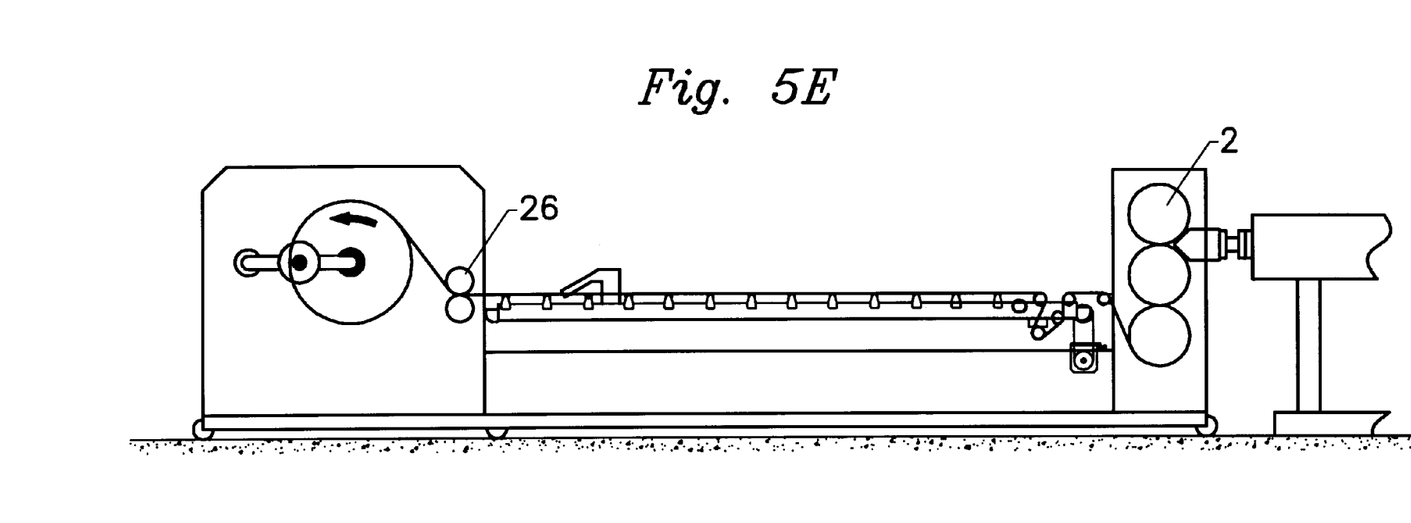

FIG. 5(A) shows the extrusion line in normal operation during winding on a winding roll 27 on shaft 33 of the turret winder capable of indexing peripherally about axis 34 and having a second winding station 35. When the winding roll has filled up to the desired diameter, the winder is indexed counterclockwise until the sheet travels over the empty winding roll 35 in a top position as shown in FIG. 5(B). The pull rolls 26 are then slowed down or stopped, resulting in the distention of the accumulator loop by the movement of roll 13 in response to decreased tension. At that moment, the sheet is cut near the roll 27 and transferred to winding station 35 that is immediately re-started by making new windings, and pull rolls 26 are again accelerated to a speed somewhat above the speed of the cooling rolls 2 to unload the accumulator in response to the resulting tension increase as shown in FIG. 5(D). The turret winder can then be indexed back to the normal winding position while the full roll is removed from the winder. Once the accumulator is fully unloaded (FIG. 5(E)), the pull rolls 26 are slowed down to their original speed that is just sufficient to maintain tension on the sheet, and the winding roll again continues to build up. The change-over cycle can then be repeated whenever the roll windings achieve the desired size.

The advantages of this system will now be readily evident in compactness and space saving over heretofore available technology, and the ability to move the entire system as a unit back and forth from the die 1A.

Many other variations and modifications are available. Several alternatives are described below.

The sheet forming means may include one or more extruders used to extrude a thermoplastic polymeric sheet through a slot die of finite width. Substitutions for the sheet forming means may also be made with any apparatus which is capable of feeding a continuous sheet of material at a constant or variable rate.

The sheet processing system may also be modified by removing or adding roll cooling systems, depending upon the type of sheet material being processed. A preferred embodiment of the invention includes a roll cooling system having a three-roll stacked configuration as shown in the Nissel U.S. Pat. No. 5,466,403, granted Nov. 14, 1995.

The accumulator apparatus may also be modified to include multiple fixed and parallel acting idler rollers, along with the necessary tensioning apparatus to accommodate multiple loops of the sheet, each loop horizontally extending directly and stacked in substantially horizontal configuration under the conveyor, as shown in FIGS. 4A and 4B, thereby providing increased accumulator storage capacity to accommodate sheet processing systems that have higher line speeds, or to provide compact accumulation to save valuable space.

The sheet processing system may be modified by inclining the conveyor somewhat. In any of the above-described configurations, the substantial parallel acting idler roller 13 operates to form a loop of the sheet parallel, substantially parallel to the conveyor.

The control means of the sheet processing system may include selected electrical or electronic control apparatus designed to monitor different aspects of the system, including but not limited to the speed of formation of the sheet, the position of the parallel acting idler roller, the tension applied by the tensioning means, the speed of the pull rolls, the speed of the sheet as it is fed into the winder, or any combination thereof, which allows precise control of the processing, accumulation, and take-up of the sheet.

Comparison of FIGS. 1 and 2, and FIGS. 4A and 4B, shows the substantial reduction of floor space achieved according to this invention. Though the extruders 10 and cooling rolls 2 and 11 are in the same floor position, the length of the whole extrusion line to the take-up rolls 7, 27 is greatly reduced in FIG. 2 as compared to FIG. 1.

It is to be understood that the above-described embodiments are simply illustrative of the application of the principles of the invention. Various changes, substitutions and alterations may be devised by those skilled in the art which will embody the principles of the invention and are within the spirit and scope of the invention as defined by the appended claims.

What is claimed is:

1. A plastic sheet extrusion system comprising:
   (a) a sheet extrusion die,
   (b) extruder means connected to feed plastic material continuously in a downstream direction to and through said die,
   (c) a plurality of cooling rolls adjacent said sheet extrusion die and connected to conduct and cool said plastic material from said sheet extrusion die,
   (d) a roller cooling conveyor having a sheet carrying surface extending downstream of said cooling rolls, said conveyor extending substantially horizontally or inclined to the horizontal a length to cool the sheet,
   (e) a moveable roller forming said sheet into at least one extendible and contractable accumulator loop also extending substantially horizontally or inclined to the horizontal and positioned adjacent to and beneath said roller conveyor just below said sheet carrying surface,
   (f) a set of mechanically driven pull rolls downstream of said accumulator loop, and
   (g) a winder positioned to wind said plastic sheet on a take-up roll,
      whereby said accumulator loop serves to permit roll change at said winder at reduced speed or zero speed by temporarily accumulating the plastic sheet produced by said sheet extrusion die, and
   (h) means for increasing the speed of said pull rolls to empty said accumulator loop after said roll change has been completed.

2. A sheet processing system comprising:
   (a) a sheet forming means for continuously forming a sheet;
   (b) a cooling conveyor having an upstream portion and a downstream portion, for receiving and transporting said sheet from said sheet forming means, said conveyor extending substantially horizontally or at an angle to the horizontal a length to cool the sheet;
   (c) an accumulator connected to carry said sheet, said accumulator extending in a substantially horizontal direction beneath said conveyor, said accumulator comprising an intermittent sheet take-up system by forming said sheet into at least one substantially horizontally accumulated loop of said sheet; and
   (d) a sheet take-up means positioned downstream of said conveyor and including said intermittent sheet take-up system.

3. A sheet processing system as in claim 2, wherein said sheet forming means comprises one or more extruders connected to continuously extrude a thermoplastic sheet through a slot die of finite width.

4. A sheet processing system as in claim 2 further comprising one or more roll cooling systems downstream of said sheet forming means for receiving said sheet from said sheet forming means, cooling said sheet and feeding said sheet to said conveyor.

5. A sheet processing system as in claim 4, wherein said roll cooling system comprises one or more cooling rolls.

6. A sheet processing system as defined in claim 2, wherein said accumulator comprises:
   (a) at least one fixed idler roller and at least one parallel acting idler roller positioned at least substantially beneath said upstream portion of said conveyor; and
   (b) a tensioning means, positioned at least substantially beneath said upstream portion of said conveyor operatively connected to said parallel acting idler roller for selectively displacing said parallel acting idler roller away from said fixed idler roller, thereby extending the length of sheet travel and forming at least one parallel loop located substantially beneath said conveyor.

7. A sheet processing system as in claim 2, wherein said sheet take-up means comprises:

(a) an edge trimmer positioned adjacent said conveyor for trimming said sheet to its desired width;

(b) a set of driven pull rolls positioned downstream of said edge trimmers for drawing said sheet longitudinally along said conveyor and through said accumulator; and (c) a winder positioned to receive said sheet from said pull rolls and to produce a finite length roll of said sheet.

8. A sheet processing system as in claim 6, further comprising a control means adapted to control the accumulation of said sheet.

9. A plastic sheet extrusion system as in claim 1, further comprising an edge trimmer positioned adjacent said conveyor at a location upstream of said winder.

* * * * *